US007675008B2

(12) United States Patent
Arbour-Neagoe et al.

(10) Patent No.: US 7,675,008 B2
(45) Date of Patent: Mar. 9, 2010

(54) ATTACHMENT OF CONNECTOR BUSHINGS TO TUBULAR ELECTRIC HEATING ELEMENTS

(75) Inventors: Michael Arbour-Neagoe, Edmonton (CA); Chris Duggan, Edmonton (CA); Eric Anzinger, Edmonton (CA)

(73) Assignee: CCI Thermal Technologies Inc., Edmonton, Alberta (CA)

( * ) Notice: Subject to any disclaimer, the term of this patent is extended or adjusted under 35 U.S.C. 154(b) by 536 days.

(21) Appl. No.: 11/584,970

(22) Filed: Oct. 23, 2006

(65) Prior Publication Data

US 2009/0065495 A1 Mar. 12, 2009

(30) Foreign Application Priority Data

Oct. 5, 2006 (CA) .................................... 2562608

(51) Int. Cl.
*H05B 3/08* (2006.01)
*H02G 15/02* (2006.01)

(52) U.S. Cl. ....................... 219/541; 219/542; 219/548; 174/77 R; 174/652; 174/92; 174/93; 439/452; 29/868; 29/869; 29/520; 29/613; 338/228; 338/226

(58) Field of Classification Search ................. 219/541, 219/542, 544; 174/77 R, 652, 92–3; 439/452; 29/868–9, 520, 613; 338/228, 226
See application file for complete search history.

(56) References Cited

U.S. PATENT DOCUMENTS

| | | | | |
|---|---|---|---|---|
| 3,617,614 | A * | 11/1971 | Henry | 174/77 R |
| 4,835,855 | A * | 6/1989 | Eaton et al. | 29/869 |

OTHER PUBLICATIONS

Watlow's FIREROD® Enters $50^{th}$ Year of Service In Heating Element Market, Watlow Electric Manufacturing Co., internet article, St. Louis, MO.

Product Bulletin Air Heating Tubular Elements with Fins and Bare Tubular Elements, internet article, France.

* cited by examiner

*Primary Examiner*—Shawntina Fuqua
(74) *Attorney, Agent, or Firm*—Dinsmore & Shohl LLP

(57) ABSTRACT

Connector bushings are crimped to the terminal ends of tubular electrical heating elements for heating equipment, particularly equipment intended for use in hazardous environments, e.g. where there is a risk of explosion.

12 Claims, 5 Drawing Sheets

ATTACHMENT OF CONNECTOR BUSHINGS TO TUBULAR ELECTRIC HEATING ELEMENTS

FIELD OF THE INVENTION

The present invention relates to the attachment of connector brushings to the terminal ends of tubular electrical heating elements for heating equipment, particularly equipment intended for use in hazardous environments where there is exposure to moisture, corrosive or flammable substances and/or situations in which there is a risk of explosion.

BACKGROUND OF INVENTION

Tubular electrical heating elements are used in a wide variety of heating devices/equipment and provide the means for producing the heat energy required in these devices. Tubular heating elements are generally comprised of an outer tubular metal sheath of a desired diameter and thickness, dependent on the application. Encased within the outer tubular sheath is an electrically conductive resistance wire surrounded by magnesium oxide which acts as an electrical insulator between the wire and the outer tubular sheath. When current flows through the wire, the wire temperature increases and subsequently the temperature of the outer sheath of the element also increases thereby producing heat energy. The ends of such tubular elements are normally mounted in connector bushings which, in turn, are contained in an electrical box which has an electrical supply. The connector bushing normally exits the box and is secured to it by a suitable fastener with the wire having a terminal end adapted for connection to an electrical supply.

A commonly used method of attaching bushings to electrical heating elements uses brazing or welding. Depending on the attachment method used, additional steps must be taken to ensure that the joint between the bushing inner surface and the tubular element outside surface is waterproof and gas tight. If the bushing is brazed, the brazing metal used will form a water and gas tight seal. Other methods involve the use of epoxy or other sealants to ensure a water and gas tight seal. For tubular elements installed in equipment for use in hazardous locations where the possibility of an explosion exits, the interface between the bushing and the sheath of the tubular element must provide a zero tolerance and have sufficient mechanical strength to sustain an explosion. The certified and accepted method currently employed in attaching a terminal bushing to a tubular heating element for use in hazardous locations is brazing. Brazing still employs manual steps although a number of bushings are now brazed by automated brazing machines. In order to ensure the integrity of the joint the currently approved and accepted method of testing the joint is hydrostatic testing. Currently, applicants are not aware of any non-brazed bushings available on the market that have been approved for use in hazardous locations due to the very tight and strong joint required between the bushing and the element sheath. Epoxy, silicone or other means of sealing the joint are not allowed in the construction of heater elements for hazardous applications.

Accordingly, objectives of the present invention are to provide (a) an improved method of attaching a connector bushing to a tubular heating element usable in heating devices intended for use in hazardous locations and (b) an improved tubular element/connector bushing combination as produced by such method. The method provides sufficient mechanical integrity and a zero tolerance fit between the bushing and the element sheath which is strong enough to sustain an explosion while providing a non-flame path in the construction of the heating device.

It is yet a further object of the present invention to provide a means of attaching a connector bushing to a tubular heating element such that the element to bushing joint will have negligible thermal limitations over the entire operating range of the tubular heating element.

It is still a further object of the present invention to provide a means of attaching a connector bushing to a tubular electrical element in a fashion such that routine hydrostatic testing of the joint is not required to satisfy the appropriate safety and standards authorities.

SUMMARY OF THE INVENTION

The invention in one aspect provides a method of attaching a connector bushing to an end of a tubular electric heating element comprising: providing an elongated sleeve-like bushing having a bore extending along the longitudinal axis thereof; said bushing being of a deformable, crimpable metal; inserting an end portion of a tubular electric heating element into said bore such that said end portion extends along and within said bore, said bore and said element having diameters selected such that a close sliding fit exists between them; positioning a portion of the bushing together with the element end portion located therein into a crimping machine having a plurality of radially arranged jaws in such manner that said jaws surround said bushing portion; activating said crimping machine to cause said jaws to advance radially toward and to engage said bushing portion all around the circumference thereof with sufficient force to radially deform and crimp the metal of said bushing portion into a force fit engagement with the heating element end portion.

The jaws of said crimping machine, in a preferred form of the invention, apply sufficient force that the bore of said portion of the bushing is permanently reduced to a diameter slightly less than the original outside diameter of the element which existed prior to the activation of the crimping machine thereby to assist in providing a fluid-tight joint between the bushing and the element which is capable of strongly resisting relative axial displacement therebetween.

Stated differently, the jaws of said crimping machine preferably act with sufficient force as to radially deform and crimp the metal of said bushing portion into an interference fit with said heating element wherein the bore diameter of the radially deformed portion of the bushing and the outside diameter of the element end portion are permanently reduced in a crimping zone to a common value which is less than the element diameter which existed prior to the crimping step, said crimping zone being spaced from a free end of said end portion of the element.

The bushing preferably has a pair of cylindrical sections disposed on opposing sides of a larger diameter intermediate portion which acts as a mechanical shoulder for fastening purposes, a first one of said cylindrical sections being threaded for fastening purposes and the other one of said sections comprising said portion of the bushing which is engaged and deformed by the jaws of the crimping machine.

The connector bushing is preferably made of free machining brass or a metal with similar characteristics.

In a further aspect, the invention provides, in combination, a tubular electric heating element having a connector bushing mounted on an end portion of said element; said bushing being of an elongated sleeve-like configuration and having a bore extending along the longitudinal axis thereof and being made of a deformable, crimpable metal; said end portion of the element extending along and within the bore of the bushing; and a portion of said bushing having been radially deformed and crimped into a force fit engagement all around the heating element end portion.

The heating element is preferably of circular cross-section and of preselected diameter throughout its length except at a location where said bushing is in said force fit engagement with said element, with the bore of said bushing portion and the outside diameter of said heating element at said location having a common diameter less than said preselected diameter to provide a fluid-tight joint, said location being spaced inwardly from an outer free end of said end portion of said element.

In a preferred embodiment, the bushing portion is in an interference fit with said heating element, with the bore of the radially deformed portion of the bushing and the outside diameter of the element end portion engaged thereby having a common value which is less than the diameter of those portions of the element not engaged by said bushing.

The bushing typically comprises a pair of generally cylindrical sections located to opposing sides of a centrally located diametrically larger shoulder portion. One said cylindrical section is preferably threaded for fastening purposes with the other generally cylindrical section comprises said bushing portion which has been radially deformed and crimped.

As noted briefly above, in accordance with a typical embodiment of the present invention, the bushing has two cylindrical sections on opposing sides of a centrally located diametrically larger portion of the bushing which acts as a mechanical shoulder for fastening purposes. One cylindrical section of the cylindrical bushing has exterior threads for fastening the bushing to e.g. an electrical box. The cylindrical section of the bushing employs a smooth machined surface. The bushing is attached to the sheath of the element located within the bushing by mechanical forces through the use of a plurality of circumferentially positioned crimper jaws acting simultaneously to apply radially inwardly directed forces on the non-threaded machined section of the bushing, as a result of which the metal of the bushing is deformed such as to form a crimped extremely tight fit between the bushing and the element. Thus, the force required to dislodge the bushing from the element is far greater than the pressure forces likely to be experienced in an explosion. The joint created by such means has enough mechanical strength, both longitudinal and torsional, that it is acceptable for use on tubular elements installed in devices intended to operate in hazardous locations.

BRIEF DESCRIPTIONS OF THE DRAWING FIGURES

DETAILED DESCRIPTION OF PREFERRED EMBODIMENT

Figure 1:
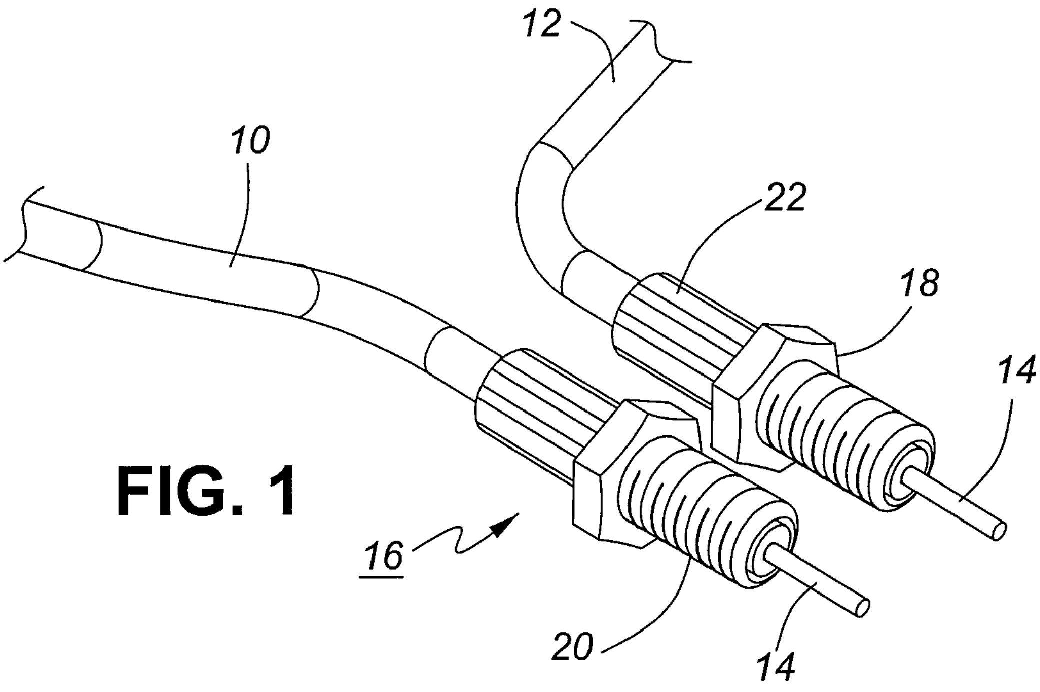
FIG. 1 is a perspective view of end portions of the heating element with attached connector bushings.

FIG. 1 is a perspective view showing a typical tubular electric element 10 of any well-known variety as described in the background discussion. The element has a metal sheath 12 such as Incoloy (trade name) surrounding a core of magnesium oxide within which is embedded an electrically conductive heating wire, the ends of which are terminated by terminal pins 14 projecting outwardly of the element ends.

Mounted to the element end portions are respective connector bushings 16 each shaped to define a pair of cylindrical sections disposed on opposing sides of an enlarged hexagonal diametrically enlarged portion 18 providing a shoulder for fastening purposes. The outermost cylindrical section 20 is threaded to receive a nut (not shown) for mounting the connector bushing 16 to a metal wall of a terminal box (not shown). The opposing cylindrical section 22 of the bushing is crimped onto the heating element to provide force fit fluid-tight engagement between the element 10 and connector bushing 16 as will be described hereafter.

Figure 2:
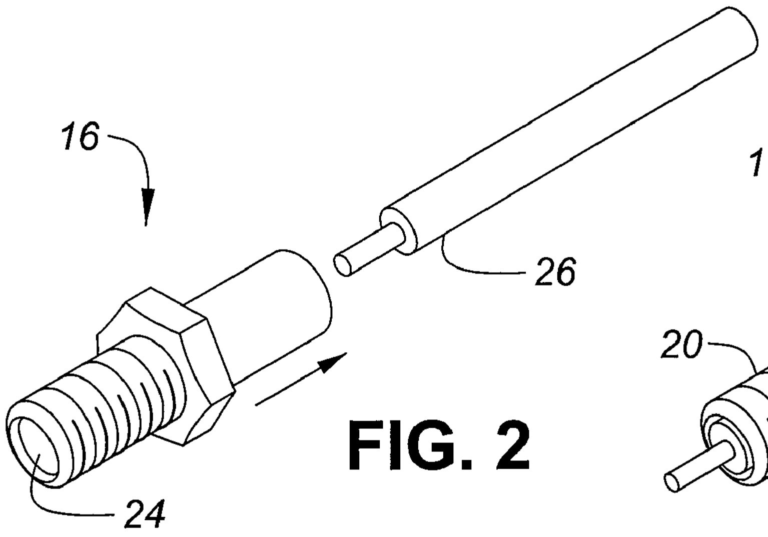
FIGS. 2, 3 and 4 are perspective views illustrating placement of the connector bushing on an element end portion.
Figure 3:
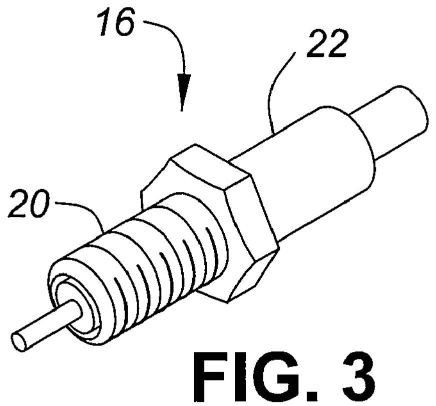
Figure 4:
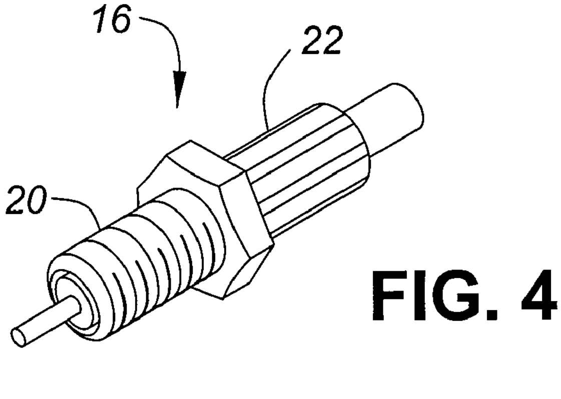

Referring to FIGS. 2, 3 and 4, the method of attaching the connector bushing 16 to the end of tubular electric heating element 10 includes the steps of holding the elongated sleeve-like bushing 16 having a bore 24 extending along the longitudinal axis thereof, (the bushing being of a deformable, crimpable metal as described hereafter), and inserting an end portion of tubular electric heating element 10 into the bore 24 such that the element end portion 26 extends along and within the bore, the bore 24 and said element 10 having diameters selected such that a close sliding fit exists between them (as more fully described hereafter). As seen in FIG. 3, the end face of bushing 16 is lined up with the end of the element sheath. Then the bushing 16 together with the element end portion 26 located therein are put into a crimping machine (FIGS. 11A-11D) having a plurality of radially arranged jaws in such a manner that the jaws surround the bushing section 22.

The crimping machine is then activated to cause its jaws to advance radially toward and to engage the bushing section 22 all around the circumference thereof with sufficient force to radially deform and crimp the metal of the bushing section (see FIG. 4) into a force fit engagement with the heating element 10 end portion. The crimping process will be described in detail hereafter.

Figure 5:
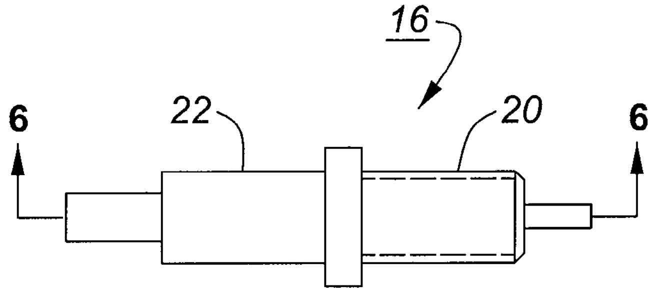
FIG. 5 is a side elevation view of an uncrimped bushing located on an element end portion.
Figure 6:
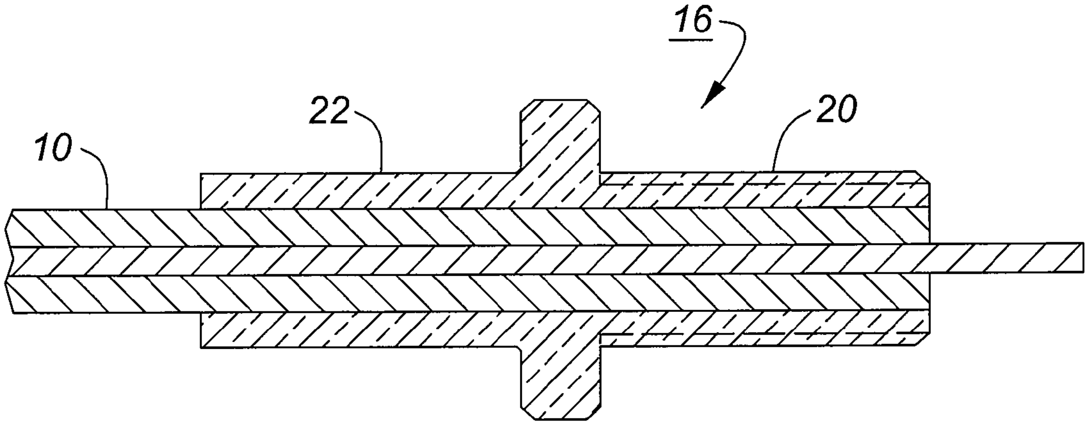
FIG. 6 is a longitudinal section view of the assembly shown in FIG. 5.
Figure 7:
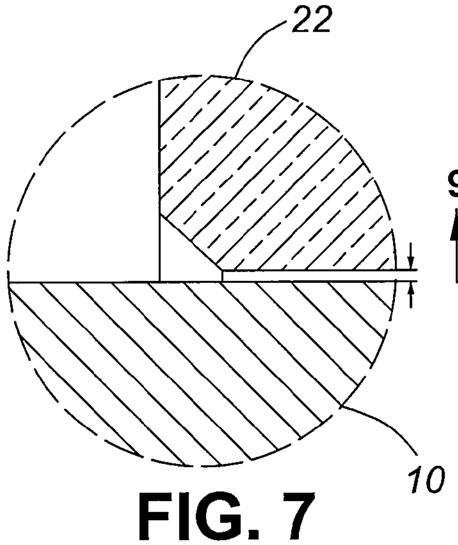
FIG. 7 is a section view of detail "C" shown in FIG. 6.
Figure 8:
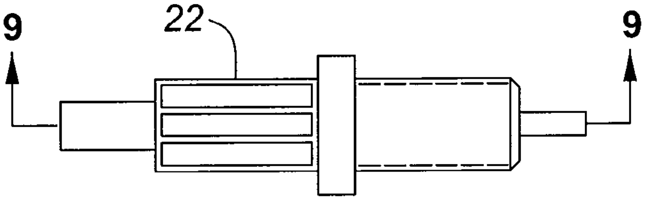
FIGS. 8 and 9 are similar to FIGS. 5 and 6 but with the bushing shown as fixedly crimped on to the heating element.
Figure 9:
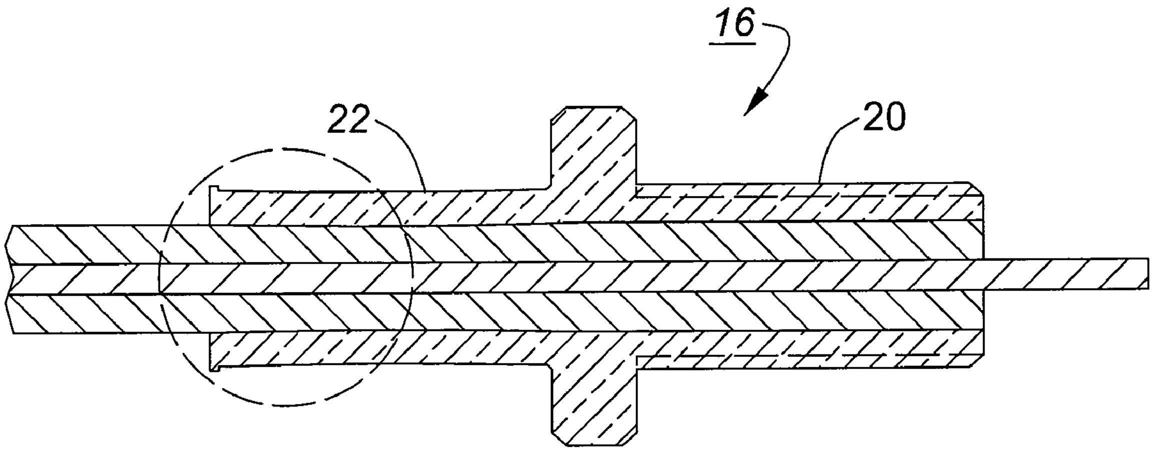
Figure 10:
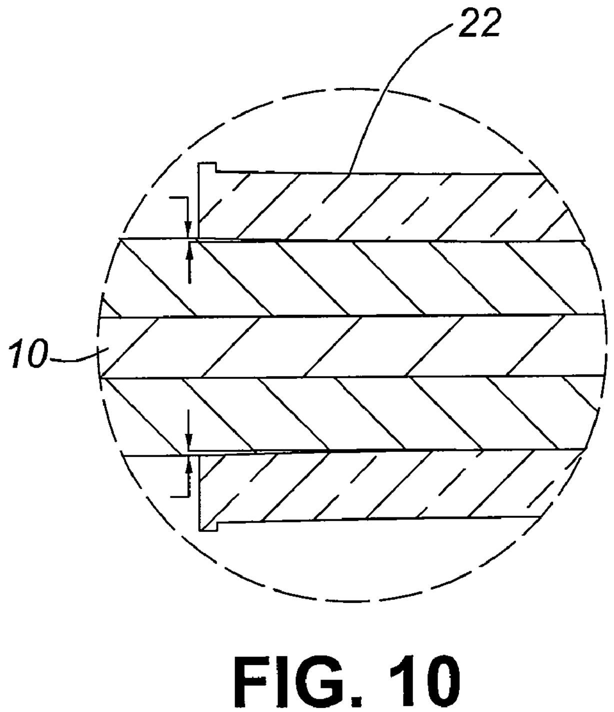
FIG. 10 is a section view of the detail "D" seen in FIG. 9.

FIG. 5 is a side elevation of the connector bushing-heating element combination before crimping while FIG. 6 shows the same combination in longitudinal section. FIG. 7 is a section view of detail "C" in FIG. 6 showing a typical clearance between element 10 and bushing 16 prior to crimping. FIGS. 8, 9 and 10 show the same combination but after the crimping (also termed swaging) has been completed. As described hereafter in detail the jaws of the crimping machine apply sufficient force that the bore of section 22 of the bushing 16 is permanently reduced in the crimping zone to a diameter slightly less than the original outside diameter of the element 10 which existed prior to the activation of the crimping machine thereby to assist in providing a fluid-tight, explosion-resistant joint between the bushing 16 and the element 10 which is capable of strongly resisting relative axial displacement therebetween. Detail "D" in FIGS. 9 and 10 clearly shows this diameter reduction. Stated differently, the jaws of said crimping machine act with sufficient force as to radially deform and crimp the metal of bushing section 22 into an interference fit with the heating element 10 wherein the bore diameter of the radially deformed section 22 of the bushing 16 and the outside diameter of the element 10 end portion contained therein are permanently reduced in the crimping zone to a common value which is slightly less than the element diameter which existed prior to the crimping step. The crimping zone is spaced a distance in from the extreme free end of the element end portion 26 as best seen in FIG. 9 and FIG. 10 (Detail D).

The connector bushing is made from any one of a number of reasonably crimpable, deformable metals such as free machining brass, e.g. C 36000 free machining brass. Free machining brass has hardness in the range: Rockwell B-78 hard, F78 soft. Other properties such as tensile and yield strengths are readily available from engineering texts and the like.

FIGS. 11A-11E illustrate the crimping (often called swaging) process. The crimping machine 30 is commercially available, e.g. a "FINN POWER", Model P321S. As shown crimping machine 30 has a plurality of radially arranged jaws 32 biased apart by coil springs 34 into engagement with the frustro-conical bore 36 of the machine housing. Axial displacement between the housing and the jaws causes jaws 32 to advance and retract in radial directions.

Figure 11A:
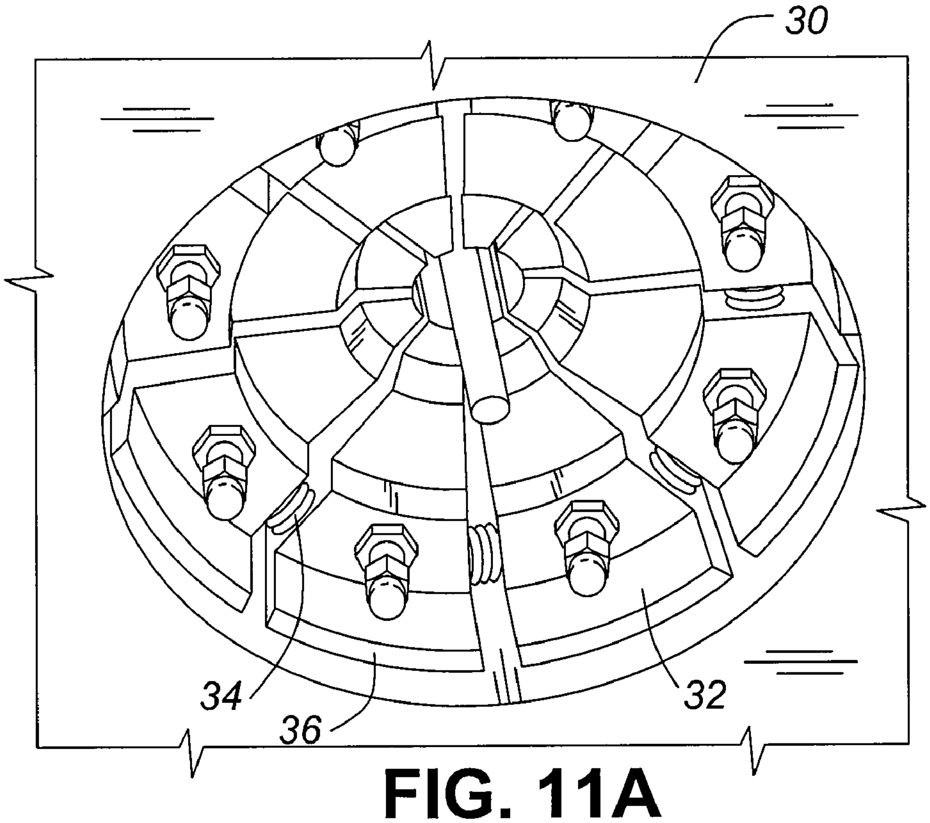
FIG. 11A to 11D are perspective views of the crimping machine showing the step-by-step procedure for crimping the connector bushing on to the heating element.
Figure 11B:
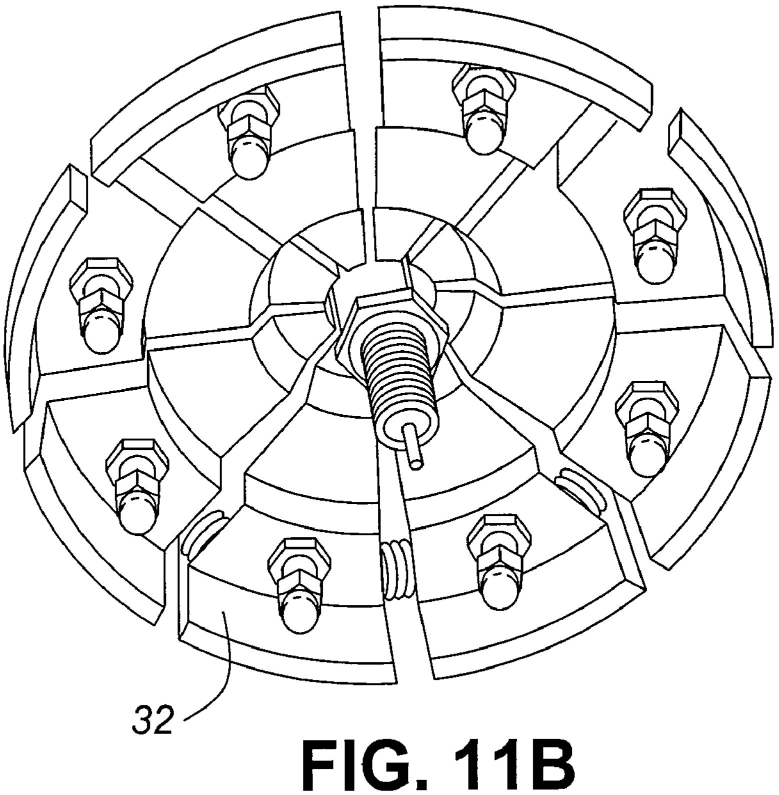
Figure 11C:
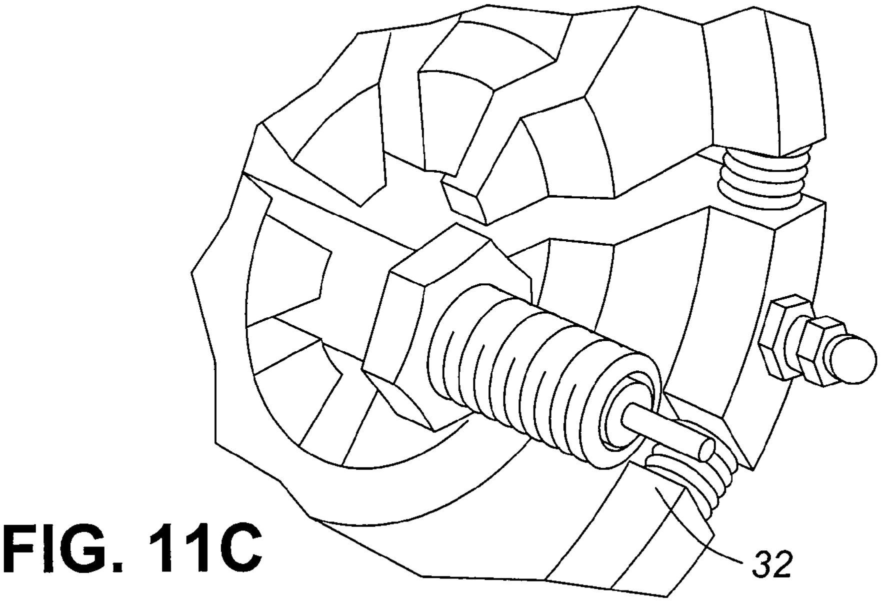
Figure 11D:
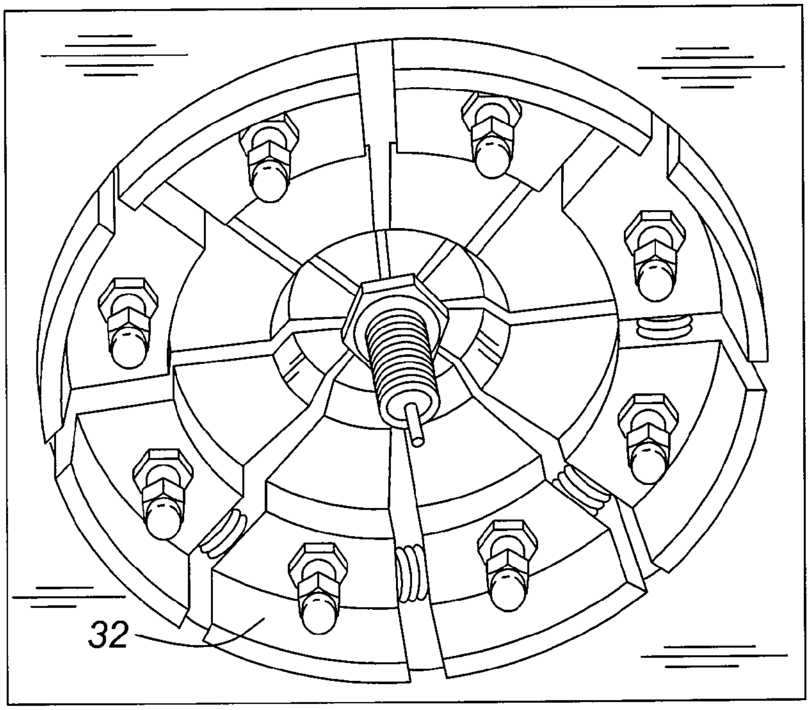
Figure 11E:
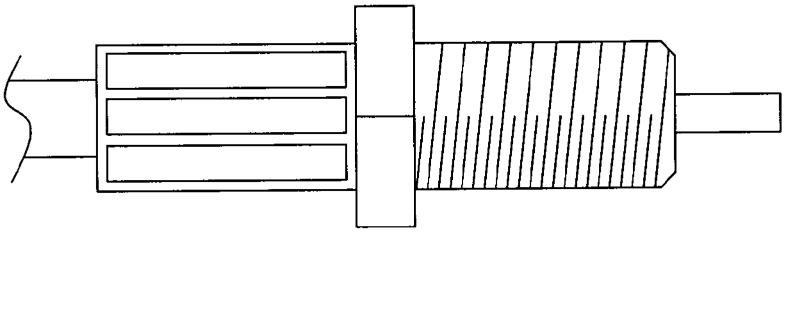
FIG. 11E is a further view of the crimped bushing and heater element at the end of the procedure.

As shown in FIG. 11A, the first step is to place the end of heating element 10 at the axis of the crimping machine, the jaws 32 surrounding element 10 in spaced relation. Then, in FIG. 11B, the connector bushing 16 is slid onto the end of element 10 such that the end of threaded section 20 is flush with the end of the element sheath. The element 10 together with bushing 16 are moved axially (FIG. 11C) into position such that the inner ends of jaws 32 surround section 22 of bushing 16. Then, holding the element-bushing assembly in place, the crimping machine is activated (FIG. 11D) to bring the crimping jaws 32 into forceful engagement with section 22 of the bushing so that the bushing is crimped all around its circumference. The jaws automatically release on completion of the crimping process. The crimped bushing and element are removed (FIG. 11E) and the procedure repeated for the opposing end of the heating element.

The following Table gives some typical non-limiting dimensions (ins.). (Bushing material is C 36000 free machining brass.)

TABLE

| | Element O.D. | Bushing I.D. (bore) | Bushing O.D. (Section 22) |
|---|---|---|---|
| **Before Crimping of Bushing** | | | |
| No. 1 | 0.375" | 0.379" | 0.562" |
| No. 2 | 0.315" | 0.319" | 0.562" |
| **After Crimping** | Element O.D. (in crimp zone) | Bushing I.D. (in crimp zone) | Bushing O.D. (in crimp zone) |
| No. 1 | 0.365" | 0.365" | 0.539" |
| No. 2 | 0.305" | 0.305" | 0.529" |

The following comments should clarify the data given above.

The ratio of the bushing ID to OD may be about 0.57 which is only a ratio picked to set some guidance for the crimping process. This guidance is driven primarily by the crimping machine and the brass material used. The machine can only crimp to a maximum pressure and the brass can only withstand a maximum pressure along with the element to which the brass is being crimped onto. The bushing has 2 ID's only because there are two sizes of bushings needed to accommodate the requirements of the product-line. In the example given the bushing ID cannot be smaller than 0.379" or 0.319"; the corresponding element that it is crimped to is 0.375" and 0.315". Both of which sets of Figures give some idea of what is meant by the expression "free sliding fit" referred to herein. The fit should be as close as possible commensurate with reasonable ease of assembly, i.e. ease of insertion of the element 10 into connector bore 24.

The diametric ratio between OD not crimped to OD crimped is 0.06%, which means that the OD is crimped by 6%. The calculated numbers are Original OD=0.562", crimped OD–0.539" or 0.529". So the ratio= 1–(0.529/0.562)=6%. The final crimped OD cannot be larger than 0.539" yet can be smaller by 0.01". The reductions in element outside diameter and bushing bore diameters in the crimp zone to common values are clearly shown in the above table.

Testing that has been done for the joint includes one example from Factory Mutual and CSA that subjected the joint to the following test. "The test pressure was equal to 400% or 1005 psi of maximum measured ignition pressure of 264 psi. The pressure was increased at a rate no less than 100 psi/min. and held at a maximum test pressure of 1060 psi for one minute". Reference FM file ID 3019408.

The above-noted test clearly establishes that the joint is fluid-tight and capable of withstanding explosive forces likely to be encountered in use as well as satisfying the general objectives set out earlier in this specification.

A preferred embodiment of the invention has been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

The invention claimed is:

1. A method of attaching a connector bushing to an end of a tubular electric heating element comprising:

providing an elongated sleeve-like bushing having a bore extending along the longitudinal axis thereof; said bushing being of a deformable, crimpable metal;

inserting an end portion of a tubular metal electric heating element into said bore such that said end portion extends along and within said bore, said bore and said element having diameters selected such that a close sliding fit exists between them;

positioning a portion of the bushing together with the element end portion located therein into a crimping machine having a plurality of radially arranged jaws in such manner that said jaws surround said bushing portion;

activating said crimping machine to cause said jaws to advance radially toward and to engage said bushing portion all around the circumference thereof with sufficient force to radially deform and crimp the metal of said bushing portion into a direct force fit engagement to provide a fluid tight seal with the heating element end portion.

2. The method of claim 1 wherein the jaws of said crimping machine apply sufficient force that the bore of said portion of the bushing is permanently reduced to a diameter slightly less than the original outside diameter of the element which existed prior to the activation of the crimping machine thereby to assist in providing a fluid-tight joint between the bushing and the element which is capable of strongly resisting relative axial displacement therebetween.

3. The method of claim 1 wherein the jaws of said crimping machine act with sufficient force as to radially deform and crimp the metal of said bushing portion into an interference fit with said heating element wherein the bore diameter of the radially deformed portion of the bushing and the outside diameter of the element end portion are permanently reduced in a crimping zone to a common value which is less than the element diameter which existed prior to the crimping step, said crimping zone being spaced from a free end of said end portion of the element.

4. The method of claim 3 wherein said bushing has a pair of cylindrical sections disposed on opposing sides of a larger diameter intermediate portion which acts as a mechanical shoulder for fastening purposes, a first one of said cylindrical sections being threaded for fastening purposes and the other one of said sections comprising said portion of the bushing which is engaged and deformed by the jaws of the crimping machine.

5. The method of claim 3 wherein said connector bushing is made of free machining brass.

6. The combination of a tubular metal electric heating element and a connector bushing which is mounted on an end portion of said element;

said bushing being of an elongated sleeve-like configuration and having a bore extending along the longitudinal axis thereof and being made of a deformable, crimpable metal;

said end portion of the element extending along and within the bore of the bushing; and a portion of said bushing having been radially deformed and crimped into a direct force fit engagement to provide a fluid tight seal all around the heating element end portion.

7. The heating element connector bushing combination of claim 6 wherein said heating element is of circular cross-section and of preselected diameter throughout its length except at a location where said bushing is in said force fit engagement with said element, with the bore of said bushing portion and the outside diameter of said heating element at said location having a common diameter less than said preselected diameter to provide a fluid-tight joint, said location being spaced inwardly from an outer free end of said end portion of the element.

8. The combination of claim 6 wherein said bushing portion is in an interference fit with said heating element with the bore of the radially deformed portion of the bushing and the outside diameter of the element end portion engaged thereby having a common value which is less than the diameter of those portions of the element not engaged by said bushing.

9. The combination according to claim 7 wherein said bushing comprises a pair of generally cylindrical sections located to opposing sides of a centrally located diametrically larger shoulder portion.

10. The combination according to claim 8 wherein said bushing comprises a pair of generally cylindrical sections located to opposing sides of a centrally located diametrically larger shoulder portion.

11. The combination according to claim 9 wherein one said cylindrical section is threaded for fastening purposes with the other generally cylindrical section comprises said bushing portion which has been radially deformed and crimped.

12. The combination according to claim 10 wherein one said cylindrical section is threaded for fastening purposes with the other generally cylindrical section comprises said bushing portion which has been radially deformed and crimped.

* * * * *